(12) United States Patent
Bergmann et al.

(10) Patent No.: US 10,960,923 B2
(45) Date of Patent: Mar. 30, 2021

(54) HYDRAULIC STEERING FACILITY WITH LOAD SIGNAL

(71) Applicant: Danfoss Power Solutions Parchim GmbH, Parchim (DE)

(72) Inventors: Erhard Bergmann, Banzkow (DE); Manfred Schildmann, Karrenzin (DE); Hartmut Vossberg, Parchim (DE)

(73) Assignee: Danfoss Power Solutions Parchim GmbH, Parchim (DE)

( * ) Notice: Subject to any disclaimer, the term of this patent is extended or adjusted under 35 U.S.C. 154(b) by 338 days.

(21) Appl. No.: 16/031,914

(22) Filed: Jul. 10, 2018

(65) Prior Publication Data

US 2019/0031233 A1    Jan. 31, 2019

(30) Foreign Application Priority Data

Jul. 28, 2017   (DE) .......................... 102017117149.5

(51) Int. Cl.
*B62D 5/07* (2006.01)
*B62D 5/093* (2006.01)
*B62D 5/065* (2006.01)
*B62D 5/09* (2006.01)

(52) U.S. Cl.
CPC ............. *B62D 5/075* (2013.01); *B62D 5/065* (2013.01); *B62D 5/07* (2013.01); *B62D 5/09* (2013.01); *B62D 5/093* (2013.01)

(58) Field of Classification Search
CPC .......... B62D 5/075; B62D 5/065; B62D 5/07; B62D 5/09
See application file for complete search history.

(56) References Cited

U.S. PATENT DOCUMENTS

| 5,014,596 A | * | 5/1991 | St. Martin | ............... B62D 5/09 91/427 |
| 5,620,026 A | * | 4/1997 | Stephenson | .............. B62D 5/09 137/516 |
| 5,641,033 A | * | 6/1997 | Langkamp | ............. B62D 5/065 180/400 |

(Continued)

FOREIGN PATENT DOCUMENTS

| DE | 4410693 C2 | 5/1996 |
| EP | 0096963 A2 | 12/1983 |

*Primary Examiner* — Ruth Ilan
*Assistant Examiner* — Conan D Duda
(74) *Attorney, Agent, or Firm* — Perkins Coie LLP; Jordan Becker

(57) ABSTRACT

The invention relates to a hydraulic steering facility for mobile systems, with a steering circuit for a steering facility and a working circuit for a working hydraulic system, whereby the steering circuit and the working hydraulic system are connected to a supply pump via a shared flow dividing valve and the flow dividing valve is connected to a load signal connection of the steering device. It is provided that the steering facility has an adjustable input choke that is connected via an inflow connection of the steering facility to the flow dividing valve, between the load signal connection and downstream of the input choke, a parallel circuit consisting of a choke and an adjustable second load signal choke is arranged, and the load signal connection is further connected via an adjustable first load signal choke to a return flow connection of the steering facility.

3 Claims, 2 Drawing Sheets

(56) References Cited

U.S. PATENT DOCUMENTS

| | | | | |
|---|---|---|---|---|
| 5,771,692 A * | 6/1998 | Bergmann | ............. | B62D 5/097 60/384 |
| 5,819,532 A * | 10/1998 | Wang | ...................... | B62D 5/09 60/384 |
| 2007/0227346 A1 * | 10/2007 | Lehtinen | ................. | B66C 23/90 91/445 |
| 2013/0090808 A1 * | 4/2013 | Lemme | ................ | B60G 17/056 701/37 |
| 2014/0374187 A1 * | 12/2014 | Arbjerg | .................... | B62D 5/30 180/441 |
| 2015/0158523 A1 * | 6/2015 | Ennemark | ............. | B62D 5/093 180/403 |
| 2015/0361791 A1 * | 12/2015 | Gisolf | ..................... | E21B 49/08 166/264 |
| 2016/0298401 A1 * | 10/2016 | Cotten | ..................... | E21B 21/08 |
| 2017/0241324 A1 * | 8/2017 | Liu | ......................... | F02N 19/10 |
| 2018/0319426 A1 * | 11/2018 | Arbjerg | .................... | B62D 5/093 |
| 2018/0319427 A1 * | 11/2018 | Arbjerg | .................... | B62D 5/14 |
| 2018/0319428 A1 * | 11/2018 | Arbjerg | .................... | B62D 5/08 |
| 2018/0319429 A1 * | 11/2018 | Arbjerg | .................... | B62D 5/08 |
| 2018/0319430 A1 * | 11/2018 | Arbjerg | .................... | B62D 5/14 |
| 2018/0319431 A1 * | 11/2018 | Arbjerg | .................... | B62D 5/14 |
| 2018/0319432 A1 * | 11/2018 | Arbjerg | .................... | B62D 5/14 |

\* cited by examiner

HYDRAULIC STEERING FACILITY WITH LOAD SIGNAL

CROSS REFERENCE TO RELATED APPLICATIONS

This application claims priority to DE 102017117149.5 filed Jul. 28, 2017, which is incorporated herein by reference.

FIELD OF THE INVENTION

The invention relates to a hydraulic steering facility.

BACKGROUND

Hydraulic steering facilities are used in mobile systems that consist of a steering circuit and a working circuit, and which are both supplied by a shared pump, whereby the steering circuit takes priority.

Such systems mainly consist of a shared supply pump and a shared flow dividing valve and a steering facility and steering cylinder on the one hand, and a working circuit on the other. The flow dividing valve is spring loaded and obtains its control signal as a so-called load signal from the hydraulic steering facility. After this load signal, the flow dividing valve regulates its flow cross-sections in such a manner that the steering circuit is supplied as a priority and according to requirements, and the working circuit is supplied with excess pressure oil. It is known that the load signal can be provided statically or dynamically. Due to the high reactivity of a dynamic load signal, this type of provision is increasingly being used in practice.

Thus, for example, a generic steering facility with a dynamic load signal is known from EP 0 096 963 A2. This steering facility has a load signal path that branches off from the main flow line before the steering facility, leading towards the spring loaded side of the flow dividing valve on the one hand and, on the other, towards a separate connection of the steering facility, opens out again within the steering facility after the first adjustable choke into the main flow line, and at the same time leads to the return flow. In the portion of the load signal path that leads to the return flow, there is an adjustment choke that behaves inversely proportional to the first adjustable choke. This steering facility has the disadvantage that in order to maintain a priority, needs-oriented supply of the steering aggregate, including at high steering speeds, and thus with high flow quantities, a regulating spring with a relatively high spring rigidity is required. However, in the neutral position, i.e. when the steering facility is not actuated, it is constantly necessary to work against this strong regulating spring in order to supply the working circuit. This leads to high energy and performance losses of the hydraulic system.

DE 44 10 693 recommends a solution for improving the energy balance of the generic hydraulic systems. With the needs-oriented increase in pressure difference, which only takes effect during steering, the use of a weaker compression spring is possible. For this purpose, a choke and an adjustable load signal choke are switched in series in a secondary line.

SUMMARY

The object is to better increase the pressure level of the load signal in accordance with requirements with steering facilities of the above type.

According to the invention, this object is attained by means of a hydraulic steering facility with the features named in claim 1. Due to the fact that the steering facility has an adjustable input choke, which is connected to the flow dividing valve via an inflow connection of the steering facility, a parallel circuit is arranged between the load signal connection and downstream of the choke an adjustable load signal choke, and the load signal connection is further connected via a further adjustable load signal choke to the return flow connection of the steering facility, it is advantageously possible to provide the load signal in a manner that is dependent on the speed. At a higher speed, i.e. with a faster steering movement, which is transferred from a steering wheel onto a rotor of a displacer unit of the steering facility, a higher regulating pressure difference is made available. Thus, faster steering movements in particular, and thus also faster changes of direction, are possible with the mobile systems equipped with hydraulic steering facilities, such as vehicles, in particular forklift trucks or similar.

In a preferred embodiment of the invention, it is provided that the input choke and the second load signal choke have opposite closing characteristics. As a result, it is advantageously possible that during a steering request, the input choke is opened, while at the same time the second load signal choke closes, so that depending on the steering movement, the regulating pressure difference on the flow dividing valve is increased.

In a preferred embodiment of the invention, it is provided that the second load signal choke only closes at a high steering speed. As a result, it is advantageously achieved that the higher regulating pressure difference is not reached immediately, but only when or shortly before the maximum speed of the steering wheel or of the rotor of the steering wheel is reached. As a result, in a highly needs-oriented manner, the pressure level of the load signal can be reached precisely at high speeds.

The invention will now be explained in greater detail below with reference to an exemplary embodiment.

BRIEF DESCRIPTION OF THE DRAWINGS

Here.

DETAILED DESCRIPTION

Figure 1:
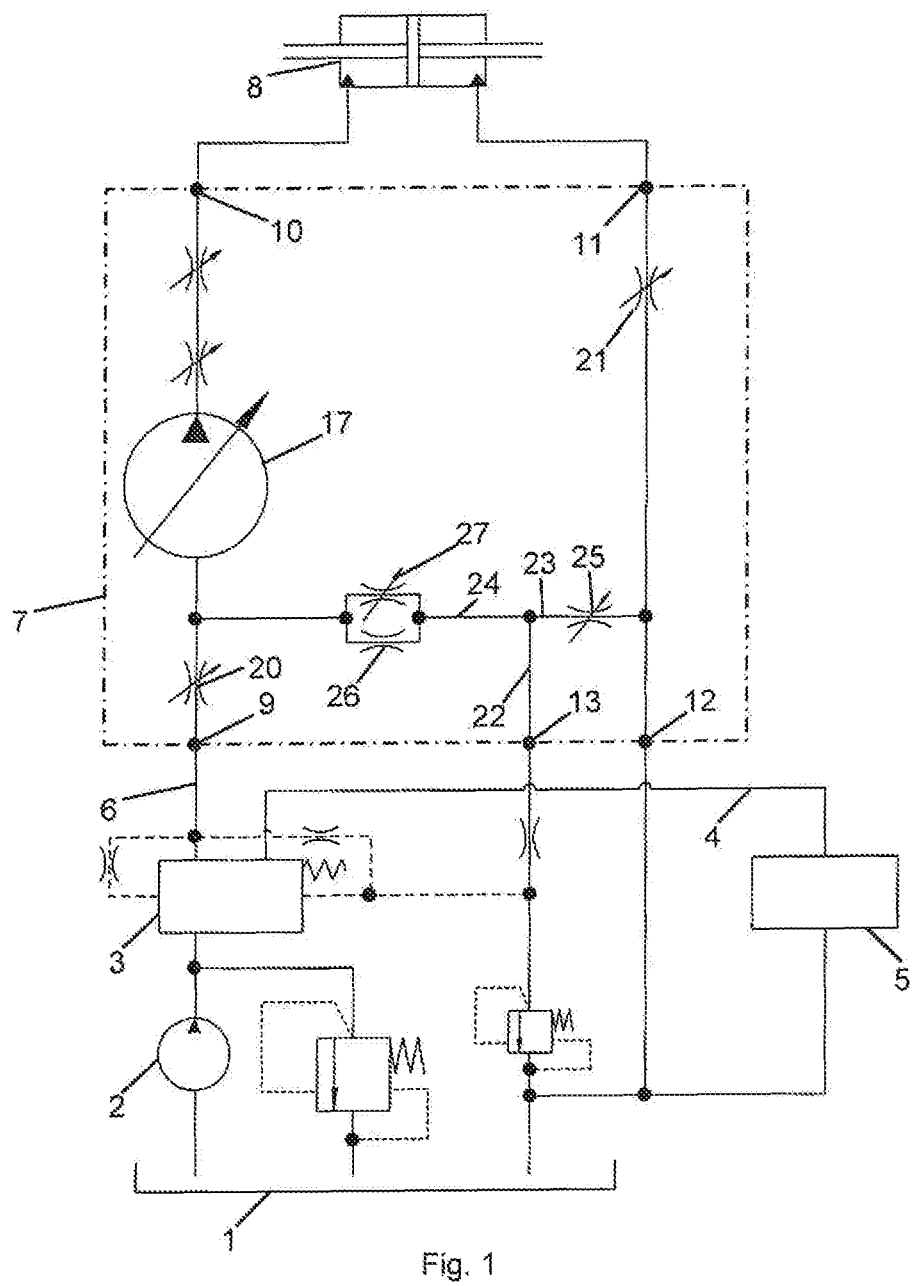
FIG. 1 shows a steering and a working circuit with a shared supply pump.

The circuit according to FIG. 1 is compiled of a steering circuit and a working circuit, and consists of shared elements, a tank 1, a supply pump 2 and a flow dividing valve 3.

From the flow dividing valve 3, an inflow line 4 branches off for a working hydraulic system 5 and an inflow line 6 branches off for a steering facility 7.

A steering cylinder 8 is arranged downstream of the steering facility 7. The steering facility 7 has an inflow connection 9 connected to the flow dividing valve 3, two cylinder connections 10 and 11 for the steering cylinder 8, a return flow connection 12 connected to the tank, and a load signal connection 13 that has a connection via chokes to the spring-loaded side of the flow dividing valve 3 and the inflow line 6 to the steering facility 7.

Figure 2:
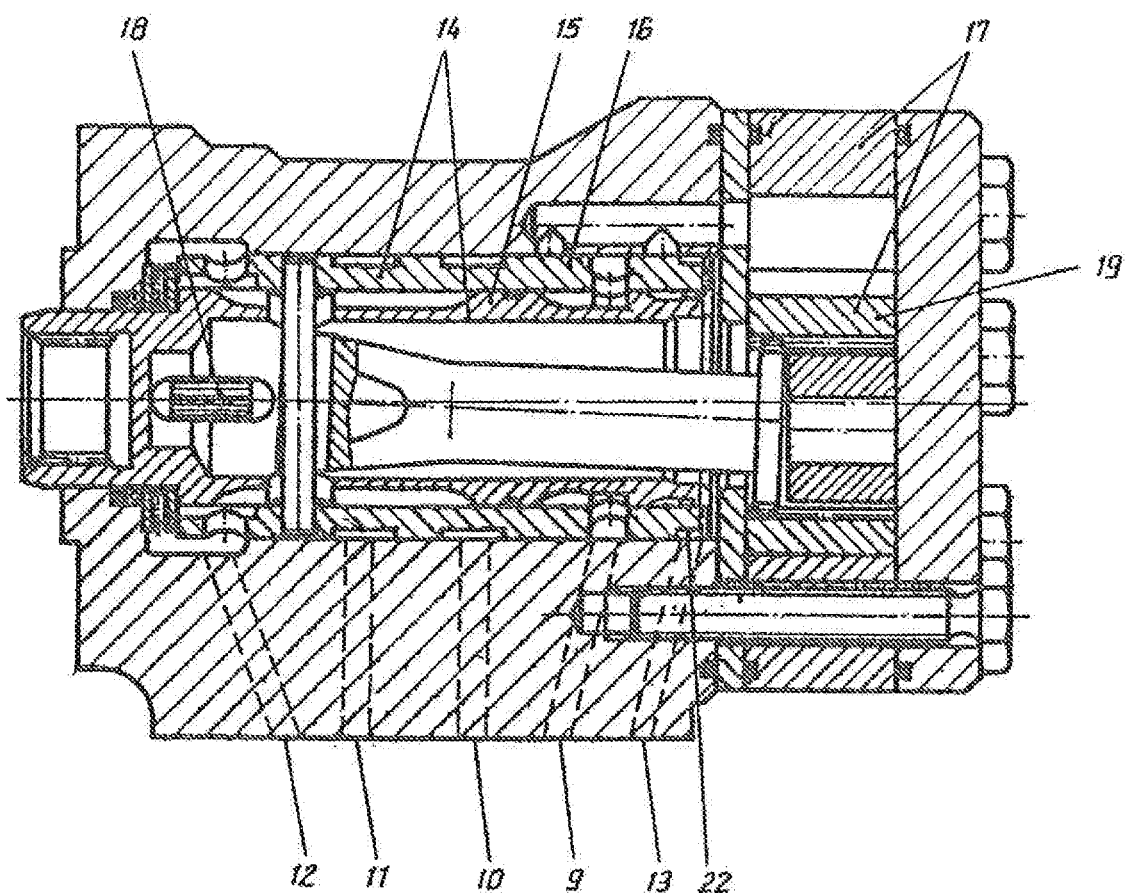
FIG. 2 shows a cross-section through a steering facility.

As is also shown in FIG. 2, the steering facility 7 consists mainly of a control unit 14 with an inner control piston 15 and an outer control sleeve 16 and a displacer unit 17 that operates according to the gerotor principle. The control piston 15 and the control sleeve 16 have axial and radial channels that communicate with each other and with the displacer unit 17, and are both rotatable towards each other against the force of a spring 18 at a limited angle.

The control sleeve 16 is mechanically connected to the rotor 19 of the displacer unit 17.

In the control unit 14, there is an adjustable input choke 20 in the main line upstream before the displacer unit 17, and downstream of the steering cylinder 8 there is an adjustable output choke 21. Further, in the control unit 14, there is a flow path 22 for the load signal, which begins in the load signal connection 13 and divides into a first path 23 with a connection to the return flow connection 12 and into a second path 24 with a connection to the main line downstream of the adjustable input choke 20. In the first path 23, a first adjustable load signal choke 25 and in the second path 24 in parallel, a choke 26 and a second adjustable load signal choke 27 are arranged. The adjustable chokes 20, 25 and 27 are designed with regard to their closure characteristics in such a manner that the first adjustable load signal choke 25 and the adjustable input choke 20 close in the opposite direction, and the second adjustable load signal choke 27 and the adjustable input choke 20 also close in the opposite direction. Depending on the application, it is possible with regard to the structure to realise the opening or respectively closing movement of the above-named adjustable chokes at different points in time.

In the neutral position of the control unit 14, the adjustable input choke 20 is closed. A technically desired oil quantity of e.g. 1 l/min flows via the load signal connection 13 to the steering facility 7. Due to the closure characteristics being in opposite directions, the second adjustable load signal choke 27 is open. The first adjustable load signal choke 25 is also open.

The oil provided by the supply pump 2 builds up a pressure in the inflow line 6 before the steering facility 7, which continues on the one hand as a pressure signal onto the non spring-loaded side of the flow dividing valve 3. On the other hand, from the same point on the inflow line 6, a load signal flow branches off that is guided to the spring-loaded side of the flow dividing valve 3 and to the load signal connection 13 of the steering facility 7. Over a short distance, via the flow path 22 and via the opened adjustable load signal choke 25 in the first path 23, the oil reaches the return flow connection 12 that leads to the tank 1.

In the flow path 22, and thus on the spring-loaded side of the flow dividing valve 3, a lower pressure level is thus created in relation to the pressure signal on the other side. These pressure conditions on the flow dividing valve 3 cause a displacement of the regulating plate in the flow dividing valve 3 into the position that guarantees the total oil flow via the flow dividing valve 3 minus the load signal flow to the working hydraulic system 5 that flows to the load signal connection 13.

When the control piston 15 is deflected, for example to the right when the steering wheel is turned, the adjustable input choke 20 opens. At the same time, the first adjustable load signal choke 25 closes. The second adjustable load signal choke 27 is in the open position. The oil provided by the supply pump 2 reaches the inflow connection 9 via the flow dividing valve 3 through the inflow line 6, and from there reaches the displacer unit 17 via the opened adjustable input choke 20. Here, the oil is dosed and made available to the steering cylinder 8. At the same time, a load signal flow flows from the inflow line 6 to the load signal connection 13, and from there via the choke 26 and the second adjustable load signal choke 27 in the second path 24 into the main flow that leads to the displacer unit 7.

The pressure conditions that are created as a result on the flow dividing valve 3 guarantee a position of the regulating plate that divides the oil flow provided by the supply pump 2. The oil quantity not required by the steering facility 7 is made available to the working hydraulic system 5.

The parallel connection of the choke 26 to the second load signal choke 27 leads to the following behaviour of the steering facility 7:

The choke 26 acts as a resistance, but is overbridged by the opened second load signal choke 27. When a desired steering movement begins, the adjustable input choke 20 opens. During the steering movement of e.g. 100 RPM on a steering wheel, which is transferred to the rotor 19 of the displacer unit, a pressure difference of e.g. 10 bar results via the input choke 20, which is created by the compression spring in the flow dividing valve 3. If faster steering movements of e.g. 150 RPM are desired, a greater regulating pressure difference is required on the flow dividing valve 3, in order to rapidly guide the oil flow required for the desired steering movement of the steering wheel into the steering facility 7. For this purpose, the closure movement of the second load signal choke 27 now begins. By closing the second load signal choke 27, a pressure difference is built up above the choke 26, which when the second load signal choke 27 is closed, is e.g. 10 bar.

This additional pressure difference is added to the pressure difference that lies above the input choke 20, so that with high steering speeds, e.g. of 150 RPM, a pressure difference of 20 bar is applied on the input choke 20 and thus on the flow dividing valve 3.

This increased pressure difference leads to a higher maximum volume flow over the input choke 20 and thus to a higher steering speed.

The high steering speed can thus very quickly enable the desired steering movement of the mobile system, such as a forklift truck, which is equipped with the hydraulic steering facility 7. Very rapid changes of direction of driving are possible.

In order to achieve the increased pressure difference at the higher steering speed, the closure characteristics of the second load signal choke 27 can be selected in such a manner that the second load signal choke 27 only closes at higher steering speeds. In particular, it can be provided that the second load signal choke 27 only closes when or shortly before the maximum speed is reached of the steering wheel or respectively that of the rotor of the control valve 7. Only then is the increase pressure difference achieved with the input choke 20.

LIST OF REFERENCE NUMERALS

1 Tank
2 Supply pump
3 Flow dividing valve
4 Inflow line
5 Working hydraulic system
6 Inflow line
7 Steering facility
8 Steering cylinder
9 Inflow connection
10 Cylinder connection
11 Cylinder connection
12 Return flow connection
13 Load signal connection
14 Control unit 15 Control piston
16 Control sleeve
17 Displacer unit
18 Spring
19 Rotor
20 Input choke
21 Output choke
22 Flow path
23 Path
24 Path
25 First load signal choke
26 Choke
27 Second load signal choke

What is claimed is:

1. A hydraulic steering facility for mobile systems, with a steering circuit for a steering facility and a working circuit for a working hydraulic system, whereby the steering circuit and the working hydraulic system are connected to a supply pump via a shared flow dividing valve and the flow dividing valve is connected to a load signal connection of the steering device, characterized in that the steering facility has an adjustable input choke that is connected via an inflow connection of the steering facility to the flow dividing valve, a parallel circuit consisting of a choke and an adjustable second load signal choke is arranged between the load signal connection and downstream of the input choke, and the load signal connection is further connected via an adjustable first load signal choke to a return flow connection of the steering facility; and wherein the second load signal choke only closes at higher steering speeds.

2. The hydraulic steering facility according to claim 1, characterized in that
the input choke and the second load signal choke have opposite closure characteristics.

3. The hydraulic steering facility according to claim 1, characterized in that
the input choke is closed in the neutral position of the steering facility and the second load signal choke is opened.

* * * * *